May 3, 1960  A. B. HUGO  2,935,597
ELECTRODE HOLDER
Filed May 23, 1958  2 Sheets-Sheet 1
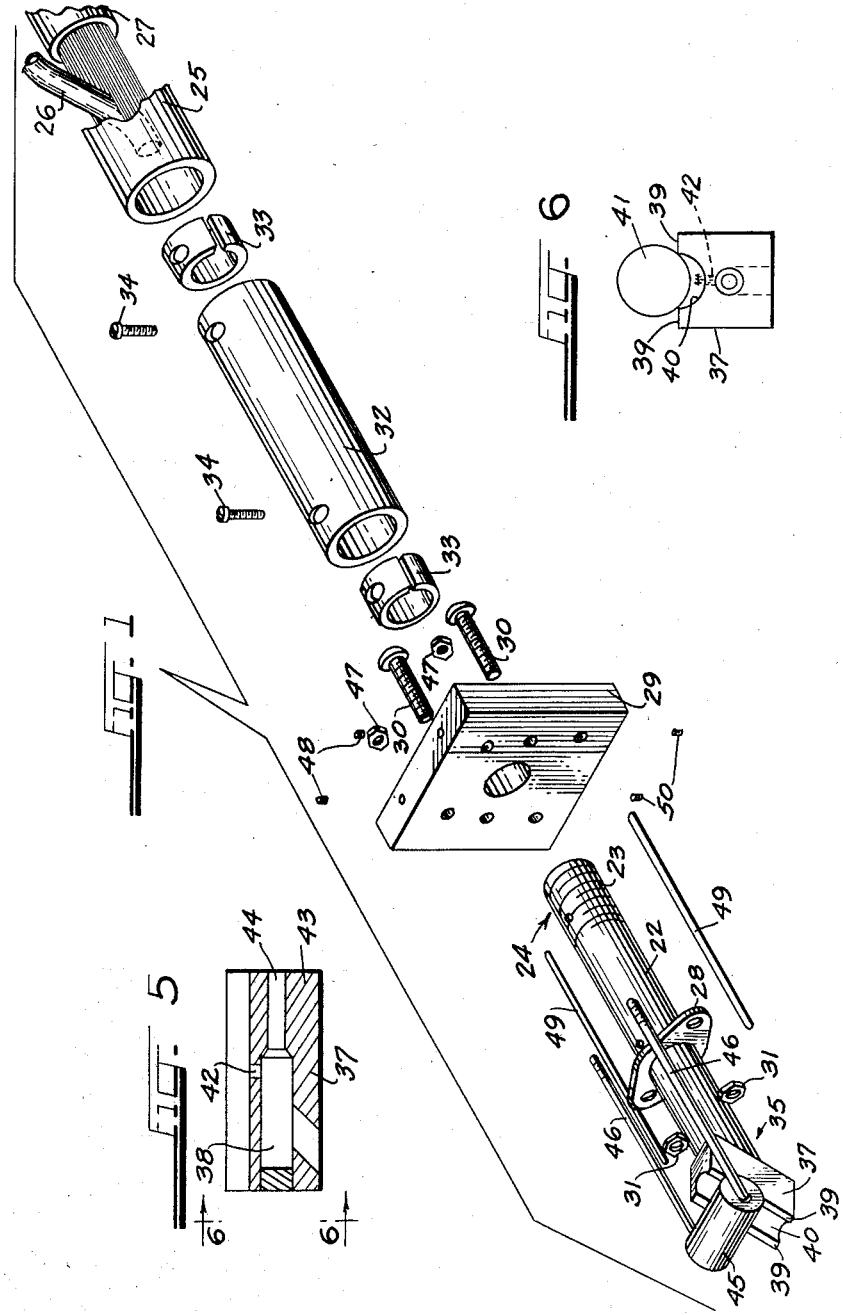
INVENTOR.
ADOLPH B. HUGO
BY HARRY C. ALBERTS

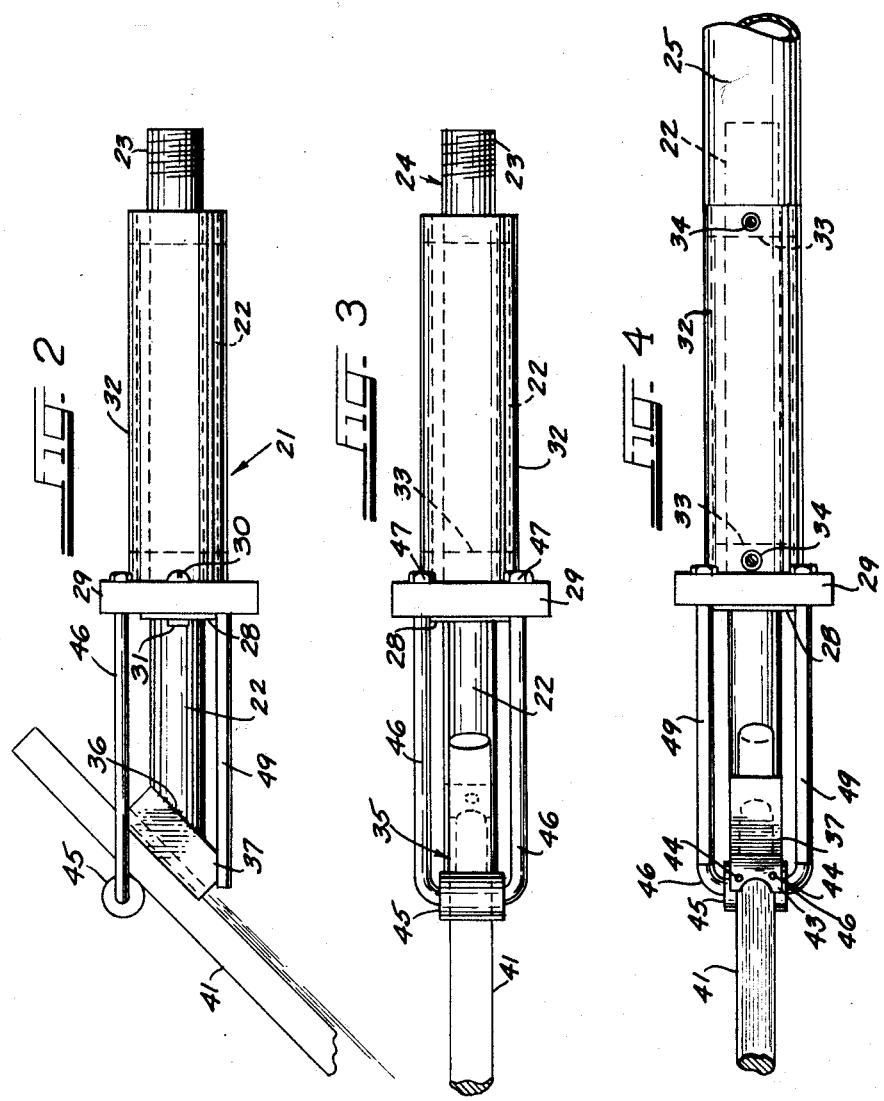

United States Patent Office 2,935,597
Patented May 3, 1960

2,935,597

ELECTRODE HOLDER

Adolph B. Hugo, Mounds, Okla., assignor to American Steel & Pump Corporation, Oklahoma Steel Cstgs. Co. Div., Tulsa, Okla., a corporation of Delaware Application May 23, 1958, Serial No. 737,291

18 Claims. (Cl. 219—140)

This invention relates to electrode holders; to such holders which particularly are intended for, although not necessarily limited to, use in holding electrodes employed with welding apparatus; and more specifically to an electrode holder provided with means for cooling of the holder, electrode and area in which arcing occurs while also blowing away oxidized materials, and which further includes a novelly constructed electrode seat and retention means including self burnishing contacts providing a comparatively large electrode contact while at the same time being so designed and arranged as to prevent material oxidation thereat and arcing between the electrode and its seat.

Electrode holders of the type disclosed herein have been known and used for some time. Such holders further are known to be subject to, among the more rigorous conditions and limitations, the necessarily large currents and high temperatures generated during operation. Undesirably, arcing between the holder and the electrode is a common occurrence; and, more often than not, the resultant accumulation of oxidized material is incapable of carrying the required current, thus accelerating, if not primarily causing, holder failure in an unduly short time. The spattering of molten metal and flux presents further problems, as does the fact that in portable equipment the holder generally is subjected to rough usage.

The design of an electrode holder further must take into consideration the possibility of accommodating a range of electrode sizes and the ability to carry currents commensurate with the demands of the various size electrodes. Sufficient contact between the holder and the electrode must be provided to carry the large currents used. Moreover, the size of the electrode employed in determinative of the amount of current necessary to achieve a proper arc; the greater the electrode cross-sectional area, the greater the current requirement; and, consideration should be given to the fact that, while the heat generated must be sufficient to melt the electrode, melting of the work piece should be avoided. Balancing the consideration that a sufficient contact area must be provided between the holder and electrode seated thereon, there is the further fact that large contact areas have proven conducive to arcing and shortening of holder life.

Corollary problems involve the accumulation of oxidized materials in the arc or work area, which oxidized materials often hinder operation; the protection which must be given an operator against flying molten metal and flux; and the accumulation of smoke and fumes in the arc or work area, which accumulation presents a danger to both health and safety.

The rigors of overheating of an electrode, of course, are readily apparent, such heating generally occurring both because of the electrical resistance within the holder and electrode and their proximity to the area of arcing, the latter being especially true as the electrode is consumed and the holder is brought nearer the arc. Spattering molten metal and flux not only hinder operation but also tend to accumulate on the holder and freeze parts together. And, arcing between the electrode and its holder causes oxidized materials to collect at their points of contact, with consequent variations in current carrying capacities and attendant overheating. A constant current supply to the electrode should be maintained at all times for proper arcing and otherwise efficient operation.

With the foregoing factors in mind, the shortcomings of electrode holders heretofore known become readily apparent and leave much to be desired. Arcing in the area of contact between the electrode and the holder, with the accompanying current variations, is common in most such known devices. Baffles and shields for protection against spraying metal and flux are unwieldy and obstructive. And, those holders known to employ some form of cooling air stream means have been for the most part ineffective to prevent overheating or to blow away slag accumulation from the arc area.

Accordingly, a primary object of the present invention is to provide an improved holder for electrodes, which holder overcomes the foregoing and other shortcomings found in prior art devices employed for similar purposes.

The present invention thus involves an electrode holder which comprises, in its most comprehensive form, a novel head construction providing unique, but proper, contact between an electrode and its seat, means for externally and internally air cooling the electrode seat as well as the electrode, and means for strategically directing an air stream along the electrode and to the area of arcing to remove slag accumulations thereat, as well as dispersing smoke and fumes.

Another object of this invention is to provide an electrode seat construction providing an area of contact between the electrode and the seat which, as the electrode is consumed and moved forward, is self burnishing and capable of removing possible accumulations of slag, oxidized materials and other foreign matter.

A further object of this invention is to provide the electrode seat structure in a form such as to facilitate and maintain proper current passage to the electrode in the area of contact with the seat while, at the same time, being resistive to accumulating of oxidized materials.

As a more specific object, this invention contemplates the provision of the electrode seat in a form providing substantially line contact with the electrode held thereon, which contact is of sufficient scope as to permit proper current passage to the electrode. It follows, moreover, and is an object hereof, that such line contact is readily susceptible and adaptable to self cleaning or burnishing as the electrode is consumed and moved therealong.

Still another specific object of the present invention is to provide the holder structure in a form conducive to ready setting and removal of an electrode to and from the same, and further to provide means imparting sufficient bias as to assure adequate contact between the electrode and its seat at all times, including that which is necessary when electrode feed provides the aforesaid burnishing action.

Further, among its objects the present invention contemplates the provision of a device for holding electrodes and having means for air cooling the electrode and its seat, including the area of contact therebetween. It follows, as an ancillary object, that such an air cooled holder has greater current carrying capacity without danger or overheating.

More specifically, an object of this invention is to provide an air flow system in an electrode holder, which system is provided throughout the holder and is arranged to transform high pressure air to expanded colder and lower pressure air thereby to increase the desired cooling effects.

Still another specific object is to direct the air flow so as to divert the spray of molten metal and flux, as well as gases and fumes, from the area of the arcing operation without interference to the latter.

To cool the electrode and the area at which it contacts its seat, this invention further contemplates the provision of a first air outlet directing air flow around the electrode in its mounting area, and a second air outlet for directing air flow along the electrode and towards the location of arcing.

Other objects of this invention are to provide an electrode holder which is comparatively simple, yet compact and rugged, in construction and economical to manufacture; one which is adequately insulated, safe to use, and is provided with guards protecting against inadvertent electrode contact; and one which otherwise is well adapted to perform the services required of it.

The foregoing objects are made possible in accordance with the present invention by the provision of an electrode holder which includes a tubular handle member which, as exemplified herein, is arranged at one end to receive electrical and air lines, and further to permit expansion of air fed thereto. At its other end the tubular member has a transversely extending head connected thereto, there being provision for air flow into the head. The head is arranged for seating thereon of an electrode, and, in particular, is provided with paired parallel extending ribs adapted to provide line contact with the electrode while maintaining the same otherwise spaced from the head. A member, preferably in the form of a roller, is engageable against the electrode to maintain the same securely in contact with the ribs while permitting axial electrode movement therealong. Air outlets are provided in the head, one for directing air flow about the electrode in the area of its contact with the head, and the others for directing air flow axially along the electrode towards the arcing area.

The foregoing and other objects, advantages and features of construction will become more apparent upon a consideration of the following description together with the accompanying drawings.

In the drawings:

Figure 1 is a partially exploded perspective view of the parts comprising the present invention;

Figure 2 is a side elevation view of the main parts of the electrode in assembled condition;

Figure 3 is a plan view of the same;

Figure 4 is an inverted plan view of the same;

Figure 5 is a cross-sectional view of the mounting head; and

Figure 6 is an end elevation view of the mounting head taken on line 6—6 in Figure 5.

The structure selected for illustration is not intended to serve as a limitation upon the scope or teachings of the invention, but is merely illustrative thereof. There may be considerable variations and adaptations of all or part of the teachings depending upon the dictates of commercial practice.

The invention illustrated and described hereinafter is embodied in an electrode holder primarily intended for use as portable welding equipment, but it should be understood that it may be used with equal advantage, for example, in large welding machines and even in arc lighting apparatus. Whether embodied in one or another, however, its utility and advantages become readily apparent.

Referring to the drawings, the present embodiment of the electrode holder 21 includes a hollow tubular member 22 provided with external threading 23 at one end 24 for receiving a brass collar 25. The collar 25 is adapted to receive a compressed air conduit 26 and electrical cable 27, the latter being connected to and made electrically continuous with the collar 25 by suitable means, such as silver solder. After the air and electrical lines are connected to the collar, they further are taped in position and covered by a rubber insulating sleeve or boot (not shown). As seen in the drawings, air conduit 26 is substantially less in cross-sectional area than either member 22 or collar 25 to thereby permit expansion and cooling of air passing therein and consequently increasing the cooling efficiency.

Intermediate its ends tubular member 22 has a plate 28 surrounding its circumference and anchored thereto by means, such as welding. An insulating block 29 is provided adjacent plate 28 and affixed thereagainst by fasteners, such as screws and nuts 30, 31, respectively. That portion of tubular member 22 between block 29 and the threading 23 further is surrounded by an insulating tubular handle 32 which is held upon spacer rings 33, 33, the rings 33 and handle 32 being fixedly secured in position by suitable set screws 34, 34. In order to have good electrical conductivity, tubular member 22 preferably is made from brass pipe cut to the desired length. The spacer rings 33, 33, may be cut from standard aluminum pipe. With reference to block 29 and handle 32, they preferably may be made from any of the known and suitable non metallic, non conductive materials, such as molded plastic, fiber, rubber, or wood.

At its other end 35, tubular member 22 is cut to present a transverse end surface 36, which as illustrated herein extends at about 45 degrees from a plane normal to the axis of member 22. A mounting head 37 is secured onto the end surface 36 by means such as silver solder, and further is provided with a passage or chamber 38 having continuity of air flow from member 22 and into mounting head 37. The head 37 is provided at one surface thereof with a pair of generally parallel extending longitudinal ridges or contacts 39, 39, separated along the lengths thereof by a radial groove 40. The diameter of groove 40, or the space between contacts 39, 39, is less than the size of the electrodes 41 for which the mounting head is intended. Thus, as the electrode 41 is seated on the head 37, it sits only upon the ridge contacts 39, 39, and is otherwise spaced from the head 37. In effect, therefore, line contact is provided between the head 37 and the electrode 41.

Medially of its ends, the mounting head 37 is provided with an air passage 42 leading from chamber 38 and to the groove 40. In this manner, cooling air flows externally of the head 37 but along its groove 40 and the electrode 41, and in the area of contact between the head 37 and the electrode 41 to provide a cooling effect thereat. At its end 43 facing the area where arcing takes place, the head 37 further is provided with means for directing air flow along the electrode and to the arcing area, as exemplified in the drawings by a pair of spaced passages 44, communicating with the chamber 38 and having outlets strategically located and arranged to achieve the desired air flow along the electrode 41.

Means further are provided for maintaining and urging the electrode 41 against the ridge contacts 39, 39, of head 37. As further exemplified herein, this means, for example, includes an insulating ceramic roller 45 held on spaced steel spring rods 46, 46, secured to the block 29. The roller 45 is arranged to contact the electrode 41 at a location intermediate the ends of the mounting head 37. Means for adjusting the pressure of the roller 45 against the electrode 41 and for holding the rods 46, 46, to the block 29 are provided in the form of nuts 47 which thread onto the ends of the rods 46, 46, and thus are able to draw the same towards the block 29. Conversely, loosening of the nuts 47 allows the rods 46, 46, to withdraw from the block 29. Set screws 48 extend into the block 29 and are engageable against the rods 46 to lock the same in place.

It should be understood that other means may be provided to urge the roller 45 against the electrode 41. An essential feature of the construction should be, however, that the roller 45 permit axial movement of the electrode 41 along the contacts 39, 39, while urging the electrode 41 thereagainst. In this manner, as the electrode 41 is fed along the contacts 39, 39, it burnishes the same to remove the possible accumulation of oxidized materials or other foreign matter.

Protecting guide rods 49, 49, are mounted to the block 29 on either side thereof to extend to the mounting head 37 and prevent inadvertent contact of the latter and the electrode 41 against objects they are not intended to touch. Set screws 50, 50, extend into the block 29 and are engageable with the guard rods 49, 49, to lock the same in position.

The tubular member 22, chamber 38, and passages 42 and 44, 44, thus provide a system which cools the electrode 41, its holder, and in particular the areas most susceptible to overheating. And, the mounting head 37, roller 45 and its mounting rods 46, 46, together with the structure arranged to urge the electrode 41 against the contacts 39, 39, provide a novel head assembly which not only securely maintains the electrode 41 in position, but further provides a novel contact area which readily may be kept free of matter possibly hindering current passage. Each of the contacts further is long and relatively narrow, yet capable of passing the required current to the electrode 41. The herein construction further arranges for air passage along the electrode 41, the areas whereat overheating generally is most likely to occur, and finally to the work area whereat the air jet blows away accumulations of slag, as well as fumes and smoke.

Briefly, operation is as follows. Current follows a path from cable 27 and collar 25, through tubular member 22 to the mounting head 37 and through its longitudinal contacts 39, 39, to the electrode 41. Air passing from conduit 26 experiences expansion and cooling in tubular member 22, from where it passes to the passage or chamber 38 within the mounting head 37, and finally out the passages 42 and 44, 44.

The contacts 39, 39, further are arranged, together with the roller 45, to maintain the electrode 41 in place. The roller 45 is held on its mounting rods 46, 46, for rotation thereon so as to permit electrode axial movement while urging the electrode against it seat. The seat, in the form of the relatively long and narrow formations or contacts 39, 39, serves as a guide track for the aforesaid electrode movement, and in the scope or area of contact with the electrode 41 is readily burnished as the electrode 41 moves therealong.

Additionally, the longitudinal contacts 39, 39, serve to direct air flow along themselves and the electrode 41 to confine the cooling air at locations where overheating is likely to occur. Specifically, with an electrode 41 mounted on the contacts 39, 39, air discharged from passage 42 is confined to a path defined by the contacts 39, 39, the wall of the groove 40 within the mounting head 37, and the electrode 41, to effect cooling at these parts.

As seen in Figure 6, considerable variation in electrode size may be accommodated while mounting the electrodes 41 upon the contacts 39, 39, and achieving the desired burnishing and cooling effects.

With the arrangement of parts hereinabove described, it will be apparent that a highly simple, relatively inexpensive and very reliable electrode holder is provided. Contact between the electrode and its seat is assured, cooling air is particularly directed at areas most susceptible to heating, and proper current passage commensurate with demands may be achieved and maintained, in particular since the contacts 39, 39, may be readily and continually cleaned.

It will be understood, as indicated above, that changes in construction and arrangement of parts may be resorted to without departing from the field and spirit of the invention; that in this application only one form of the invention has been disclosed; and that the scope of the invention is defined in the appended claims.

What is claimed is:

1. An electrode holder, comprising: a hollow tubular member adapted to receive and conduct electrical current and compressed air therethrough; an electrode mounting head at one end of the tubular member, in electrical continuity therewith, and having an internal passage communicating to the surface thereof to receive air flow from the tubular member; paired generally parallel longitudinal ridges on the head, arranged to receive an electrode in substantially parallel relation thereon to hold the same spaced from the body of the head, the ridges having substantially line contact with the electrode; means connected with the tubular member and arranged for engagement with the electrode to maintain the latter on the ridges; a first conduit communicating from the passage to direct air along the head between the ridges and against the electrode surface in confronting relation with said head; and a second conduit communicating from the passage to direct air along the electrode and towards the arc end thereof to displace the molten metal therefrom.

2. The electrode holder described in claim 1 wherein the ridges, the electrode when seated thereon, and the surface of the head opposite the electrode provide a confined path, whereby air leaving the first conduit travels in the area of electrode contact with the ridges to present an external cooling effect thereat.

3. The electrode holder described in claim 1 wherein the ridges provide a guide track along which the electrode is axially movable as it is consumed.

4. The electrode holder described in claim 3 wherein the means arranged to maintain the electrode on the ridges includes a member engageable against the electrode, and further means for urging the latter member thereagainst to cause the electrode to burnish the ridges during electrode axial movement.

5. The electrode holder described in claim 1 wherein said means includes a roller engageable with the electrode at a location intermediate the ends of the head.

6. The electrode holder described in claim 1 wherein said means includes a member engageable against the electrode and connected with the tubular member by connectors including further means whereby pressure by the latter member against the electrode may be adjustably varied.

7. An electrode holder, comprising: a tubular member adapted to receive and conduct electrical current and compressed air therethrough, and a clamp for receiving and holding an electrode thereto, said clamp including a first part mounted on said tubular member and arranged to supply electrical current to the electrode and air to cool the electrode, the first part having an internal passage arranged to receive air flow from the tubular member, said first part further including paired generally parallel elongated formations arranged to seat the electrode therebetween and spaced from the body of said first part, a branch communicating from said passage and arranged to direct air flow substantially radially of the electrode and in the area between and along electrode contact with said formations, and a second branch leading from the passage and arranged to direct air flow axially along the electrode towards the arc end thereof to displace the molten metal therefrom, said clamp further including a second part cooperable with said formations to retain the electrode in position thereon and to urge the electrode into close engagement with said formations.

8. In an electrode holder having means for receiving and conducting electrical current therethrough, the improvement comprising: an electrode mounting head adapted to receive and conduct electrical current; a pair of spaced generally parallel extending longitudinal electrical contact ridges on said mounting head, said ridges being elongated and arranged to receive an electrode in substantially parallel relation thereon but spaced from said head to define an elongated air space, said ridges having substantially line contact with the electrode to provide effective electrical contact between the electrode surface and said ridges; and means in cooperable association with the ridges to maintain the electrode in rolling pressure contact therewith to create a self-cleaning contact responsive to the longitudinal displacement of the electrode along said ridges.

9. An electrode holder comprising: a body arranged for the passage of electrical current therethrough; an electrode mounting head carried on said body in electrical continuity therewith; a pair of spaced generally parallel extending longitudinal ridges on said mounting head, arranged to receive an electrode and having substantially line contact therewith and to support the electrode therebetween in relation to said mounting head; and means arranged in association with said mounting head to retain the electrode in electrical contact with said ridges while permitting axial displacement of the electrode to compensate for the consumed disappearance thereof.

10. The electrode holder described in claim 9 wherein said means includes a roller engageable with said electrode at a position intermediate the ends of said mounting head; and additionally including linkage connecting said roller with said body.

11. The electrode holder described in claim 10 wherein said linkage includes means whereby said roller may be adjustably pressured against the electrode.

12. In an electrode holder, the improvement comprising: a mounting head with a pair of spaced generally parallel extending longitudinal electrode mounting contacts arranged to receive an electrode in substantially parallel relation thereon for support in spaced relation to said head, said mounting contacts having substantially line contact with the electrode to establish effective electrical surface contact therewith; means in association with the head for maintaining the electrode against said mounting contacts without obstructing the displacement therealong; and further means in association with the head for directing a cooling air blast therefrom along a path between said mounting contacts and the electrodes.

13. An electrode holder, comprising: a tubular body arranged to receive and conduct air and electrical current flow therethrough; an electrode mounting head carried on said body in electrical continuity therewith, having means for receiving air flow therefrom, and further having a pair of generally parallel extending elongated contact ribs arranged to receive an electrode to hold the same parallel therewith and otherwise spaced from said head to define an air chamber therebetween; and means in said head for directing an air blast along said air chamber between said ribs and in the vicinity of contact between the electrode and said ribs.

14. The electrode holder described in claim 13, and additionally including further means in said head for directing an air blast along the electrode and to the arc end thereof.

15. In an electrode holder having means for receiving and conducting air flow and electrical current flow therethrough, the improvement comprising: an electrode mounting head arranged to receive and conduct said flows, and having a pair of spaced generally parallel extending contact ribs arranged to receive an electrode to hold the same parallel therewith but otherwise spaced from said head to define an air chamber therebetween, said ribs thereby further providing means for confining a stream of air over the surface of the electrode and in the vicinity of contact by the latter with said ribs.

16. An electrode mount comprised of a first member having parallel longitudinal contact formations arranged to hold an electrode thereon, said parallel longitudinal formations having substantially line contact with the electrode for supporting the electrode in spaced relation with said first member to define an air space therebetween; and a second member cooperable with said formations to hold the electrode therebetween and maintain the electrode in close engagement with said formations and in spaced relation with said first member to provide maximum cooling therefor.

17. The electrode mount described in claim 16 wherein said formations provide a path of electrical conductivity to said electrode, and wherein said second member is electrically non-conductive.

18. The electrode mount described in claim 16 wherein said second member is rotatably mounted and adapted to allow said electrode to move relative thereto on said contact formations.

References Cited in the file of this patent

UNITED STATES PATENTS

| | | |
|---|---|---|
| 2,676,231 | Dickering | Apr. 20, 1954 |
| 2,706,236 | Stepath et al. | Apr. 12, 1955 |
| 2,784,293 | Adams | Mar. 5, 1957 |